United States Patent
Valli

(10) Patent No.: US 7,684,346 B2
(45) Date of Patent: Mar. 23, 2010

(54) COMMUNICATIONS CONTROL FOR EXTENDING THE PERIOD OVER WHICH A TERMINAL IS ABLE TO HAVE AN OPEN CONNECTION WITH A HOST ACCESSIBLE VIA A PACKET DATA NETWORK

(75) Inventor: Jyrki Valli, Tampere (FI)

(73) Assignee: Nokia Corporation, Espoo (FI)

( * ) Notice: Subject to any disclaimer, the term of this patent is extended or adjusted under 35 U.S.C. 154(b) by 605 days.

(21) Appl. No.: 11/647,614

(22) Filed: Dec. 29, 2006

(65) Prior Publication Data

US 2008/0159163 A1   Jul. 3, 2008

(51) Int. Cl.
*G01R 31/08* (2006.01)
(52) U.S. Cl. .................................... 370/252
(58) Field of Classification Search .......... 370/241–253
See application file for complete search history.

(56) References Cited

U.S. PATENT DOCUMENTS

| | | | |
|---|---|---|---|
| 6,212,175 B1 | 4/2001 | Harsch | 370/338 |
| 6,507,562 B1 | 1/2003 | Kadansky et al. | 370/216 |
| 6,643,289 B1 | 11/2003 | Natanson et al. | 370/395.2 |
| 7,088,698 B1 | 8/2006 | Marsch | 370/338 |
| 2001/0041576 A1* | 11/2001 | I'Anson et al. | 455/456 |
| 2002/0176370 A1* | 11/2002 | Ohba et al. | 370/252 |
| 2003/0048780 A1* | 3/2003 | Phomsopha | 370/389 |
| 2006/0193257 A1* | 8/2006 | Behzadi | 370/230 |
| 2007/0019610 A1 | 1/2007 | Backholm et al. | 370/349 |
| 2007/0140193 A1 | 6/2007 | Dosa et al. | 370/338 |

* cited by examiner

*Primary Examiner*—Kwang B Yao
*Assistant Examiner*—Tung Q Tran
(74) *Attorney, Agent, or Firm*—Harrington & Smith

(57) ABSTRACT

A client and a host communicate in a packet data network including a plurality of routing nodes such as routers and firewalls. The host is configured to provide the client with a session and to detect the accessibility of the client by repeatedly sending keep-alive messages to the client. In order to reduce the traffic actually arriving at the client, at least some of the keep-alive message are adjusted such that their routing towards the client will be stopped before the client by storing in a Time-To-Live field specified in the Internet Protocol a value of maximum routing hops defined to correspond with the last routing node before the client on a route from the host to the client. The adaptation of the keep-alive message can also be configured to allow some keep-alive message to reach the client to occasionally test the communication path between the client and server.

28 Claims, 4 Drawing Sheets

COMMUNICATIONS CONTROL FOR EXTENDING THE PERIOD OVER WHICH A TERMINAL IS ABLE TO HAVE AN OPEN CONNECTION WITH A HOST ACCESSIBLE VIA A PACKET DATA NETWORK

FIELD OF THE INVENTION

The present invention generally relates to communications control. The invention relates particularly, though not exclusively, to extending the period over which a mobile communications terminal is able to have an open connection with a host accessible via a packet data network.

BACKGROUND OF THE INVENTION

Currently most mobile services and applications are based on a model where a terminal assumes the role of a client, which initiates communications toward a server in the network. Further flexibility is attainable by allowing also network entities to initiate connections toward a terminal.

Modern communications systems make use of open communication channels terminated at end users or communication terminals. So-called "always open" connections enable various presence and instant messaging services as well as various other services, for instance.

When an always-on connection is needed, it is also possible to send so-called heartbeat or keep-alive messages at a sufficiently high rate in order to prevent the closing of the connection due to timeouts. For instance, U.S. Pat. No. 7,088,698 discloses a method to sustain a TCP connection in which a server or host intermittently sends to a client particular "keep-alive" data packets, which are dummy TCP data packets numbered by a TCP serial number of the present counter minus one. Such data packets are neglected by the client but yet suffice to reset an idling timer at a remote server so that a session with the server would not expire as long as the host keeps on receiving acknowledgements to these keep-alive data packets from the client. Unfortunately, when using internet protocols such as User Datagram Protocol (UDP), a connection through internet firewalls, routers and network address translators (NAT) and firewalls may only be maintained in an open state for a relatively short period such as 20 seconds. Namely, the NATs and firewalls have timeouts, which cause closing of ports or more generally general closing of communication paths used in the connection, if no traffic passes through them for a certain time. However, a 20 seconds interval for receiving heartbeat data packets and responsively sending acknowledgements may cause excessive battery draining in battery operated devices such as cellular terminals which have been designed to spend time in an inactive mode when not in active use by the user.

Advanced cellular terminals have power-saving schemes in which the terminals only occasionally wake up sufficiently to check whether they are being paged and wherein transmitter circuitry is only powered when needed. Hence, modern mobile terminals may idle most of the time with the receiver and particularly transmitter side substantially switched off in order to save battery. An incoming heartbeat message described in U.S. Pat. No. 7,088,698, on the other hand, forces the terminal to wake up to receive the heartbeat data packet and to transmit an acknowledgement. Hence, the heartbeat data packets may grossly reduce the battery life of a mobile telephone and their necessary acknowledgements may drain the battery even faster due to the relatively high energy required to transmit radio signals to a base transceiver station. Moreover, even if the client has mains power, the heartbeat messages terminating at wireless terminals waste precious radio resources.

In order to reduce the power draw, it is also possible to send keep-alive data packets from a mobile terminal to the host when the mobile terminal has other signaling to do so that the transmitter need not be separately powered. Such timing allows the terminal to sleep or idle for most of the time in order to save power and also to revive a possibly dropped radio connection. Unfortunately, not all the present servers would consider received keep-alive data packets sufficient. Instead, many hosts would still keep on sending heartbeat messages terminated at the mobile terminal so that the keep-alive messages sent from the mobile terminal would be rendered unnecessary for the host to keep its session open, even if they might be good to maintain a radio connection to a radio access network.

In order to avoid or mitigate the problems resulting from the closing of communication paths, is has been recommended to lengthen the firewall and NAT timeouts. Unfortunately, the timeouts cannot be extended if it is not possible to control all of the NATs and firewalls on the route along which the data to and from the terminal has to pass. For instance, cellular telecommunications operators usually have their own NATs and firewalls that can not be controlled by other parties. Further, it is not practical to expect that the numerous NATs and firewalls of all different cellular and internet operators be adapted solely for the advantages of mobile users.

A product called Nimbuzz (www.nimbuzz.com/en/features/buzz/) uses a method, where the need for the connection is circumvented by providing a capability for a first person to ring a second person's telephone when the second person is not online to Nimbuzz. The call comes from the Nimbuzz central number and is automatically disconnected immediately after a ring or two. When the second person notes this call she starts up the Nimbuzz connection. This mechanism is, unfortunately, somewhat too laborious if the connection is often needed (e.g. to update presence status changes) and may cause excessive signaling especially in a mobile telecommunications network if such hosts the second person's terminal.

SUMMARY

According to a first aspect of the invention there is provided a method comprising:
outputting in a packet data network a first data packet from a network party towards a terminal;
associating the first data packet with a time-to-live (TTL) adjusted to enable the first data packet to reach one or more intervening network entities but not to enable the first data packet to reach the terminal, in order to maintain traffic through the one or more intervening network entities to postpone expiry of a connection between the terminal and the network party in the one or more intervening network entities.

Advantageously, by adjusting the TTL so that the first data packet will be routed all the way to said intervening network entities but not to all the way to the terminal, unnecessary traffic over the last hop to the terminal may be avoided and the terminal need not detect the first data packet. Hence, connection resources on the last hop may be spared and the terminal may be allowed to idle or sleep whilst expiry of the terminal-network party connection is postponed. Further, it may be possible to reduce the power consumption of the terminal. If the terminal is a battery operated device, its operating period may be extended.

The first data packet may be a heartbeat data packet.

The first data packet may be configured such that the terminal will detect that the first data packet is not a normal data packet, for instance, by using a mismatched serial number.

In the following, a host generally refers to a device capable of hosting a service. This host can be a computer at a fixed location or more specifically a computer program running on such a computer, or another mobile device. In both cases the communications path between the host and the terminal using the services offered by the host passes through a wireless network and through the wireless network provider's network equipment.

The first data packet may originate from a host. The associating of the first data packet with the TTL may occur at an adaptation element other than the host. Alternatively, the adaptation element may be integrated or functionally contained in the host.

Advantageously, by associating the first data packet with the TTL to adapt the first data packet not to reach the terminal may allow economically converting existing servers to mobile friendly operation in which their heartbeat data packets do not normally reach the terminal.

The adaptation element may output an acknowledgement to the host responsive to the first data packet. The outputting of the acknowledgment may emulate sending the acknowledgement from the terminal.

The method may further comprise measuring the number of hops remaining on the route of the first data packet to the terminal and the time-to-live associated with the first data packet may be adjusted so that the TTL is set to be smaller than the measured number of hops. The TTL may be set to equal to the measured number of hops minus a predetermined amount adapted to cause the first packet to pass such intervening network elements which are configured to close connections after certain length of idle time. The predetermined amount may be one or two.

Advantageously, by measuring the number of hops the TTL may be adjusted so that the first data packet will normally pass all such network entities which are configured to close the communication path between the terminal and the network party in the absence of their traffic over a predetermined expiry interval.

Alternatively, the TTL may be defined in terms of time such that the first data packet would not be routed all the way to the terminal.

The measuring of the number of hops may be based on outputting a probing data packet with a TTL set to a predetermined value; subsequently receiving the probing data packet at the other end of the connection; and computing the number of hops based on the predetermined value and the TTL of the received probing data packet. The difference between the said predetermined value and the TTL of the probing data packet may correspond to the number of hops between different ends of the connection.

The measuring of the number of hops may be based on observing the remaining TTL (that is, the TTL on reception) in the data packets of the actual data that are sent from the terminal, and computing the number of hops based on the predetermined TTL originally set for the data packet at the terminal, and known to the host, and the remaining TTL of the data packet when it is received in the host. This method may not be completely reliable as the packet routes may not be identical to both directions.

The method may further comprise sending a keep-alive message from the terminal to the network party at a first interval in order to ensure that the network party is still accessible to the terminal.

The method may further comprise performing the steps of outputting the first data packet and associating the time-to-live according to the first aspect of the invention repeatedly with a second interval.

The method may further involve measuring of the number of remaining hops with a third interval. Advantageously, the third interval may be substantially longer than the second interval. Additionally, or alternatively, the first interval may be substantially longer than the second interval.

Advantageously, first data packets may be sent towards the terminal but stopped before the terminal repeatedly with a frequency substantially higher than the frequency with which the terminal communicates with an access point, for example. Hence, a connection may be kept open for extended periods of time without excessive power consumption and communications at the terminal.

According to a second aspect of the invention there is provided an adaptation element, comprising:
an input configured to input a first data packet traveling in a packet data network from a network party towards a terminal, which packet data network comprises one or more intervening network entities on a route between the network party and the terminal;
a processor configured to associate the first data packet with a time-to-live (TTL) adjusted to enable the first data packet to reach the one or more intervening network entities but not to enable the first data packet to reach the terminal, in order to maintain traffic through the one or more intervening network entities in order to postpone expiry of a connection between the terminal and the network party in the one or more intervening network entities.

According to a third aspect of the invention there is provided a computer program stored in a computer readable medium, the computer program comprising computer executable program code adapted to cause an apparatus to implement the first aspect of the invention.

According to a fourth aspect of the invention there is provided a terminal comprising:
a communication unit for receiving a first data packet from a packet data network;
a processor configured to detect the number of time-to-live hops the first data packet has passed in the packet data network before arriving at the terminal; and
an output for outputting to the packet data network a response packet indicative of the detected number of hops.

The first data packet may arrive at the terminal from an adaptation element. The response packet may be output for the adaptation element.

According to a fifth aspect of the invention there is provided a communication protocol comprising:
a definition for instructing a terminal to detect how many routing nodes reside on a communication path between a sender of a keep-alive packet and the terminal; and
a definition for instructing the terminal to inform the sender of the detected number of routing nodes residing on said path.

The communication protocol may further comprise a definition for setting up a first scheme according to which the terminal shall send terminal-originated keep-alive data packets to the adaptation element.

The communication protocol may further comprise a definition for setting up a first scheme according to which the client shall acknowledge terminal-terminated keep-alive data packets.

According to a sixth aspect of the invention there is provided an adaptation element according to claim 40.

According to a seventh aspect of the invention there is provided a terminal according to claim 41.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

In the following description, line numbers denote like elements. The detailed description aims to illustrate various embodiments of the invention. In this description, host generally refers to an entity which provides given service or services to a terminal. The provided service may simply be network connectivity. Various network elements described herein may be implemented as physically distributed equipment and different network elements may also be combined together without departing from the claimed invention.

Figure 1:
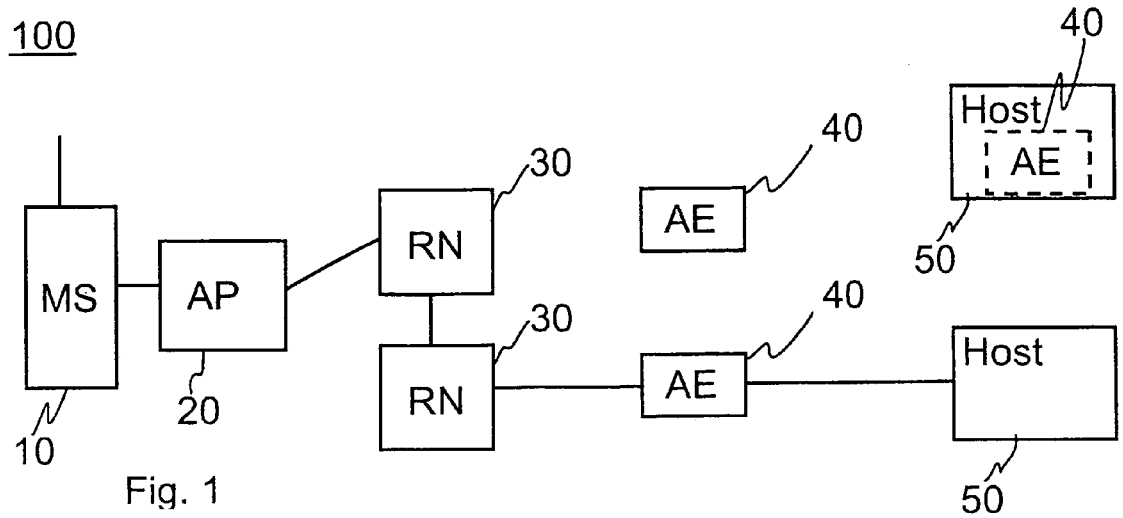
FIG. 1 shows a schematic picture of a system according to an embodiment of the invention.

FIG. 1 shows a system 100 comprising a terminal 10 (e.g. a mobile station MS), an access point such as a base transceiver station (BTS) 20 to provide connectivity to a radio access network (RAN), a plurality of routing nodes 30 such as network address translators (NAT), firewalls and routers, one or more adaptation entities 40 and one or more network parties 50, which typically act as hosts but may alternatively or additionally act as clients. The terminal 10 typically acts as a client, but alternatively and or additionally may act as a host. The entities 10, 20, 30, 40 and 50 may collectively be considered to be nodes in a communications network. The adaptation element is illustrated as incorporated to one host 50 and in other instances also separate from hosts. In sake of clearer description, it is assumed that the access point is an Internet Protocol (IP) based entity, that is addressable with one or more IP addresses. One data packet routing or communication path is illustrated by lines connecting the MS 10 to the AP 20 and thereafter to one RN 30 and further to another RN 30, then to an AE 40 (separate from network parties) and finally to a network party 50. It is understood that in practice, more than one network party 50 may simultaneously have communications with a common terminal 10 and that there may be different communication paths to different network parties 50 or to a given network party 50 on different times. In any case, on the drawn communication path, there are altogether four hops from the AE 40 to the terminal 10: first to one RN, to another RN, to the AP and finally to the terminal 10.

Whilst for better accuracy the following description should generally refer to terminal 10 and network party 50, in sake of simplicity, different embodiments may denote the terminal as a client that uses services of a host and receives data packets from the host at arbitrary times. Examples on such services are push-email, automatic push-type data feeds and different network games. Hence, the following description shall be read as illustrative only and it is to be appreciated that the terminal 10 and the network party 50 may each act as a client or host as a matter of implementation.

Figure 2:
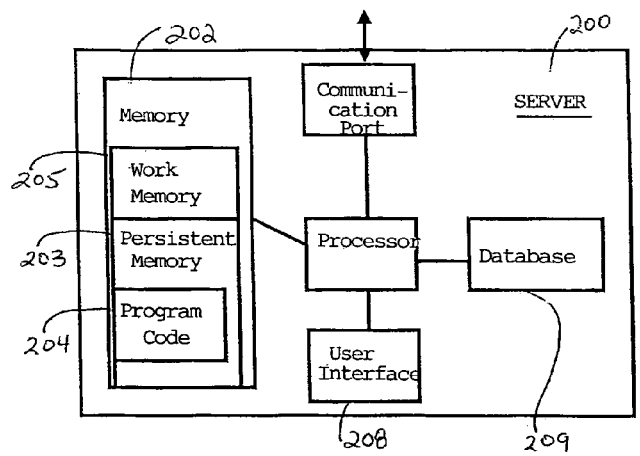
FIG. 2 shows a block diagram of a network party of FIG. 1.

FIG. 2 presents a simplified block diagram of the server 200 capable of operating as a host 50 or adaptation element 40 according to an embodiment of the invention. The server 200 comprises a memory 202 including a persistent memory 203 configured to store computer program code 204. The server 200 further comprises a processor 201 for controlling the operation of the server using the computer program code 204, a work memory 205 for running the computer program code 204 by the processor 201, a communication port 207 for communicating with other network elements and/or with subscriber terminals, an optional user interface 208 including data input and output circuitry, and a database 209. The processor 201 is typically a master control unit MCU. Alternatively, the processor may be a microprocessor, a digital signal processor, an application specific integrated circuit, a field programmable gate array, a microcontroller or a combination of such elements.

Figure 3:
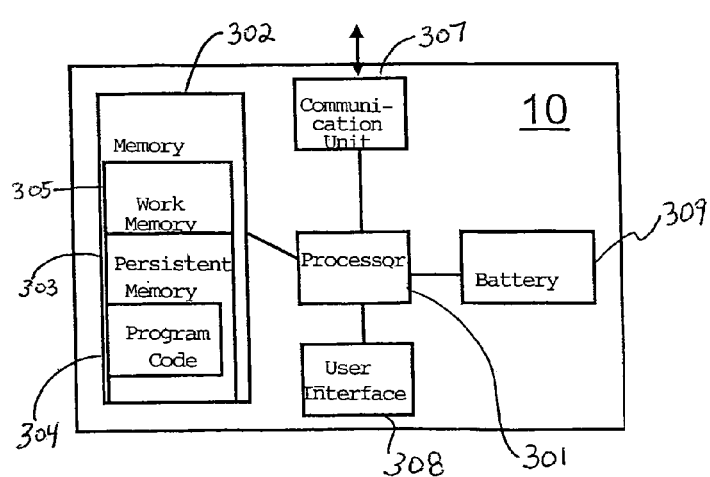
FIG. 3 shows a block diagram of a terminal of FIG. 1.

FIG. 3 shows a block diagram of the terminal 10 of FIG. 1. The terminal 10 comprises a memory 302 including a persistent memory 303 configured to store computer program code 304. The terminal 10 further comprises a processor 301 for controlling the operation of the terminal 10 using the computer program code 304, a work memory 305 for running the computer program code 304 by the processor 301, a communication unit 307 for communicating with the AP 20, a user interface 308 including data input and output circuitry, and a battery 309 for powering various components of the terminal 10 (power lines not shown). The user interface 308 typically comprises, for data output, a display and/or a speaker. For data input, the user interface 308 typically comprises one or more of the following: dedicated buttons, soft keys, touch screen, roller, microphone, voice recognition circuitry, and pointing device. The processor 301 is typically a master control unit MCU. Alternatively, the processor may be a microprocessor, a digital signal processor, an application specific integrated circuit, a field programmable gate array, a microcontroller or a combination of such elements. The terminal 10 may be a fixed network terminal such as a PSTN, ISDN or internet terminal or a mobile terminal such as a cellular or satellite terminal compatible with a standard or proprietary communications protocol. Particularly, the terminal may be a GSM and/or Wide Band Code Division Multiple Access (W-CDMA) compatible terminal. The communication unit 307 may also be configured to interface with access points according to more than one standard, for example the communication unit 307 may be operable to communicate with both a W-CDMA base station and a wireless local area network WLAN access point.

Figure 4:
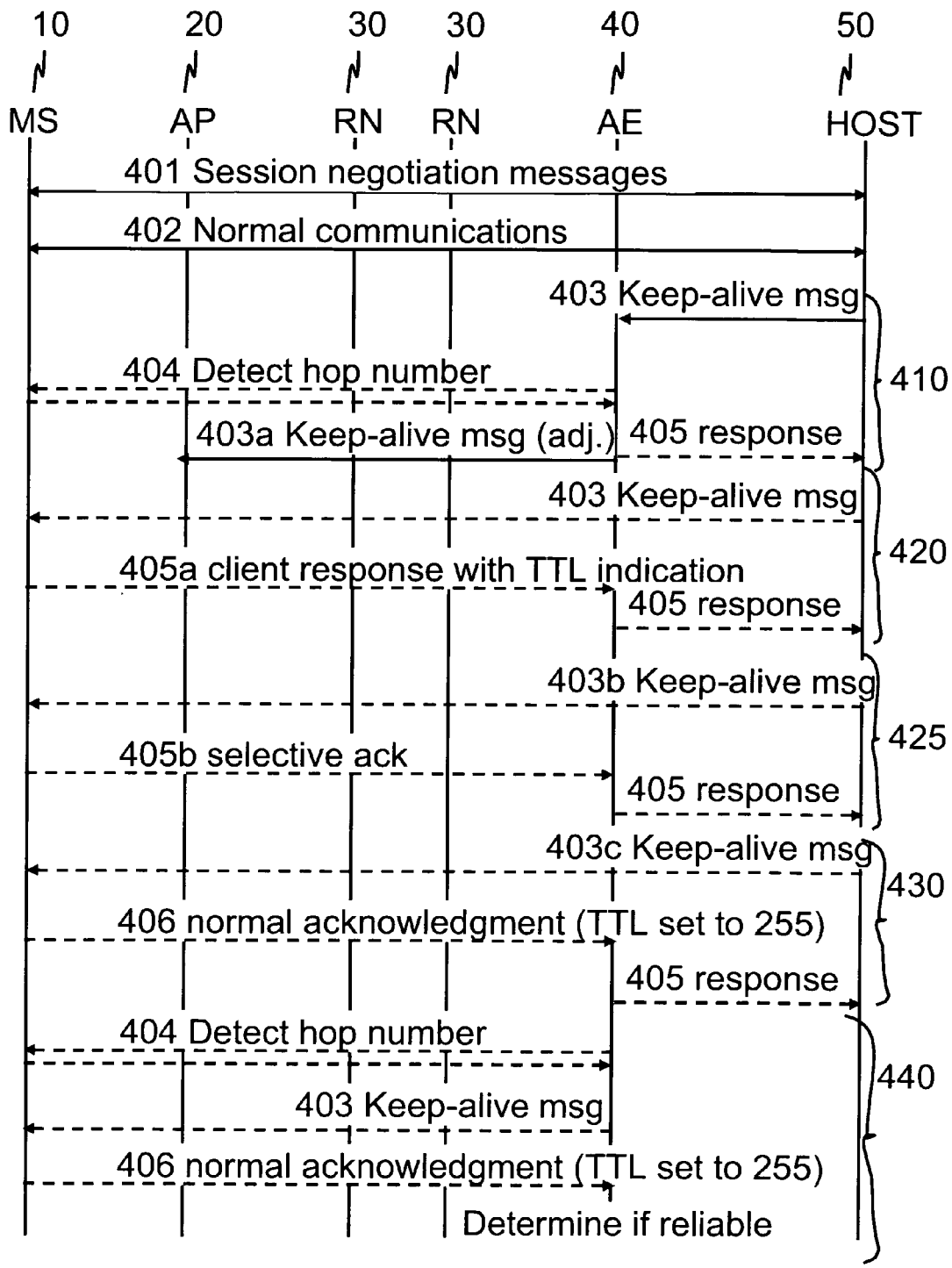
FIG. 4 shows main signaling according to an embodiment of the invention.

FIG. 4 shows main signaling according to an embodiment of the invention. FIG. 4 illustrates, from left to the right hand side, a mobile station or generally terminal 10, an access point (AP) 20, two routing nodes (RN) 30, an adaptation element (AE) 40 and a host 50. The adaptation element (AE) 40 may be a standalone node, or it may be incorporated in the host 50 either as hardware components or advantageously as functionality implemented in software, or a combination of the two. First, the terminal 10 and the host 50 negotiate a session with a set of session negotiation messages 401. This session negotiation may be conducted as is known from the art, and the type of session is not materially relevant to the invention. For example, the session may be a TCP/IP connection. After the session negotiation, the terminal 10 and the host 50 communicate 402 as usual. Let us suppose that the communicating 402 between the terminal 10 and host 50 has an extended break during which time there may be no traffic between the terminal 10 and the host 50. In order to ensure the continued accessibility of the terminal 10, the host 50 outputs or sends a keep-alive message 403 to the terminal 10. The keep-alive message may be, for instance, a TCP/IP data packet initially with a value 64 in a time-to-live header field. The adaptation element AE 40 either immediately (if incorporated to a common server with the host 50) or eventually receives the keep-alive message 403. Armed with the keep-alive message 403, the AE 40 will next act on behalf of the host 50 such that communication path towards the terminal 10 is refreshed. Whether or not the AE 40 is incorporated into the network party 50, the keep-alive message logically travels between the AE 40 and the network party 50, be this simply a primitive from one protocol layer to another or between two different applications on a common protocol layer.

In an embodiment denoted with reference 410, the AE 40 first either fetches a previously detected value or detects 404 the number of hops between the AE 40 and the terminal 10. Next, the AE 40 adjusts the TTL such that when being routed towards the terminal 10, the keep-alive message 403 is modified to a first modified keep-alive message 403a by subtracting a predetermined number from the TTL value, such that the travel of the first modified keep-alive message 403a will stop at a node close to the terminal 10. The predetermined number may depend on the network structure and may be selected so that the first modified keep-alive message 403a stops at a node that does not activate any air interface procedures, even if the hop from AP 20 to terminal 10 crosses wireless interface such as a cellular interface.

The AE 40 may also emulate the terminal 10 by waiting for a normal period of time it would take from the terminal 10 to respond to the keep-alive message 403 to the AE 40 and then pass a response 405 similar to that the terminal 10 would have sent. Alternatively, the AE 40 may output the response 405 immediately after having received the keep-alive message 403 from the host 50. If the AE 40 is incorporated in host 50, external communications are not needed for passing the response 405 to the network host 50.

It is understood that normally the AE 40 may configure the keep-alive message 403 to stop before the terminal 10 such that resources of the terminal 10 are spared and traffic between the terminal 10 and the AP 20 is reduced. However, it is also seen that the terminal 10 may move such that the hop number changes or the data packets between the terminal 10 and the host 50 may simply be re-routed over another route with a different amount of hops. In particular if the terminal is a mobile terminal, it may attach to different access points as part of normal mobility procedures, and the route between the host and terminal must then be updated accordingly, wherein the number of hops the route comprises may change. Changes in the hop number may either cause data packets arriving at the terminal 10 or not arriving at the last routing node 30 before the terminal 10 so that the communication path may be closed by that routing node. To this end, the AE 40 may be configured to intermittently contact the terminal 10 such that the number of hops is updated. The AE 40 may be alerted to a new hop number from detecting changes in data packets arriving from the terminal 10. This method may avoid the need for dedicated hop number determination traffic, although the method may not always be completely reliable as data packets are not necessarily routed along the same path in both directions, that is towards the terminal 10 and from the terminal 10.

In order to determine or update the amount of hops, the AE 40 may use standard internet tools such as the tracert command in Microsoft Windows XP®. The standard internet tools may operate without any changes to intervening entities and to the terminal 10, but they may be relatively slow and traffic-intensive to use. An alternative embodiment is depicted by reference 420, where an adapted packet data protocol is implemented in the terminal 10 to enable the terminal 10, on receiving a penetrating (un-adapted) keep-alive message 403 as a probing message, to signal back the remaining TTL value in an adapted response message 405a so as to indicate to the AE 40 how many hops there were between the terminal 10 and the AE 40. By indicating the number of hops between the AE 40 and the terminal 10, in this direction, a more accurate adjustment of TTL may be enabled than if the TTL were measured from data packets received from the terminal 10.

In a yet further embodiment depicted with reference number 425, the aforementioned adapted packet data protocol may further be so configured, that the terminal 10 need not always acknowledge the keep-alive messages it receives. Instead, the terminal 10 may be configured to send selectively acknowledgements to received keep-alive messages 403b according to a predetermined scheme, for example, after a predetermined number of penetrating keep-alive messages and to send a heartbeat message of its own initiative if no keep-alive message has been received over a predetermined time interval. To let the keep-alive message enter the terminal 10, the AE 40 may, according to a predetermined scheme, either not adjust the TTL at all (but use a normal, penetrating keep-alive messages 403) or set the TTL to match with a hop number with which second modified keep-alive messages 403b should just reach the terminal 10. As an advantage of the terminal 10 selectively acknowledging received keep-alive messages, the communication path between the terminal 10 and the AP 20 and/or the correct hop number estimate of the AE 40 may be regularly checked without necessitating the terminal 10 to always transmit data to the AP 20 on receiving a keep-alive message. Hence, logically two types of keep-alive messages can be distinguished: keep-alive messages to be explicitly acknowledged and keep-alive messages to be used by the terminal 10 to ensure that the communication path is still operable without need to acknowledge. The keep-alive messages themselves may, but need not indicate their type. In the absence of such an indication, the terminal 10 may determine the type of received keep-alive messages from the TTL value or, for example, simply classify received keep-alive messages into either type in a predetermined manner according to a predetermined classification scheme.

In yet another embodiment depicted with reference number 430, occasionally the TTL is not adjusted so that the keep-alive message 403c will normally enter at the terminal 10. The AE 40 then waits for a normal acknowledgement 406 from the terminal 10. The normal acknowledgement 406 may be originally set to TTL 255 so that the AE 40 is able to detect the number of hops between the terminal 10 and the host 50, in this direction. Whilst the hop number may vary between different directions, often there is no difference.

In a further embodiment of the invention depicted with reference number 440, the AE 40 determines whether the normal acknowledgement 406 is reliable to indicate the number of hops between the AE 40 and the terminal 10 by initiating another hop number measurement procedure and then comparing the resulting value with the TTL indication of the normal acknowledgement 406. If the determination is positive, that is indicative of capability of the terminal 10 to reliably indicate the intervening hops in the normal acknowledgement, the AE 40 may be configured to use acknowledgements of through-routed keep-alive data packets as a basis for re-setting the TTL adjustment and alternatively, when the determination is not positive, the AE 40 may employ alternative procedures for measuring the number of hops.

It is understood that the terminal 10 may either physically travel, for instance, by using mobile IP and moving from one access point to another. Further, the routing to the terminal 10 may also change, whether or not the terminal 10 moves anywhere. Either change may alter the number of hops between the terminal 10 and the AE 40. Therefore, it is advantageous to repeatedly measure the number of hops between the AE 40 and the terminal 10.

Figure 5:
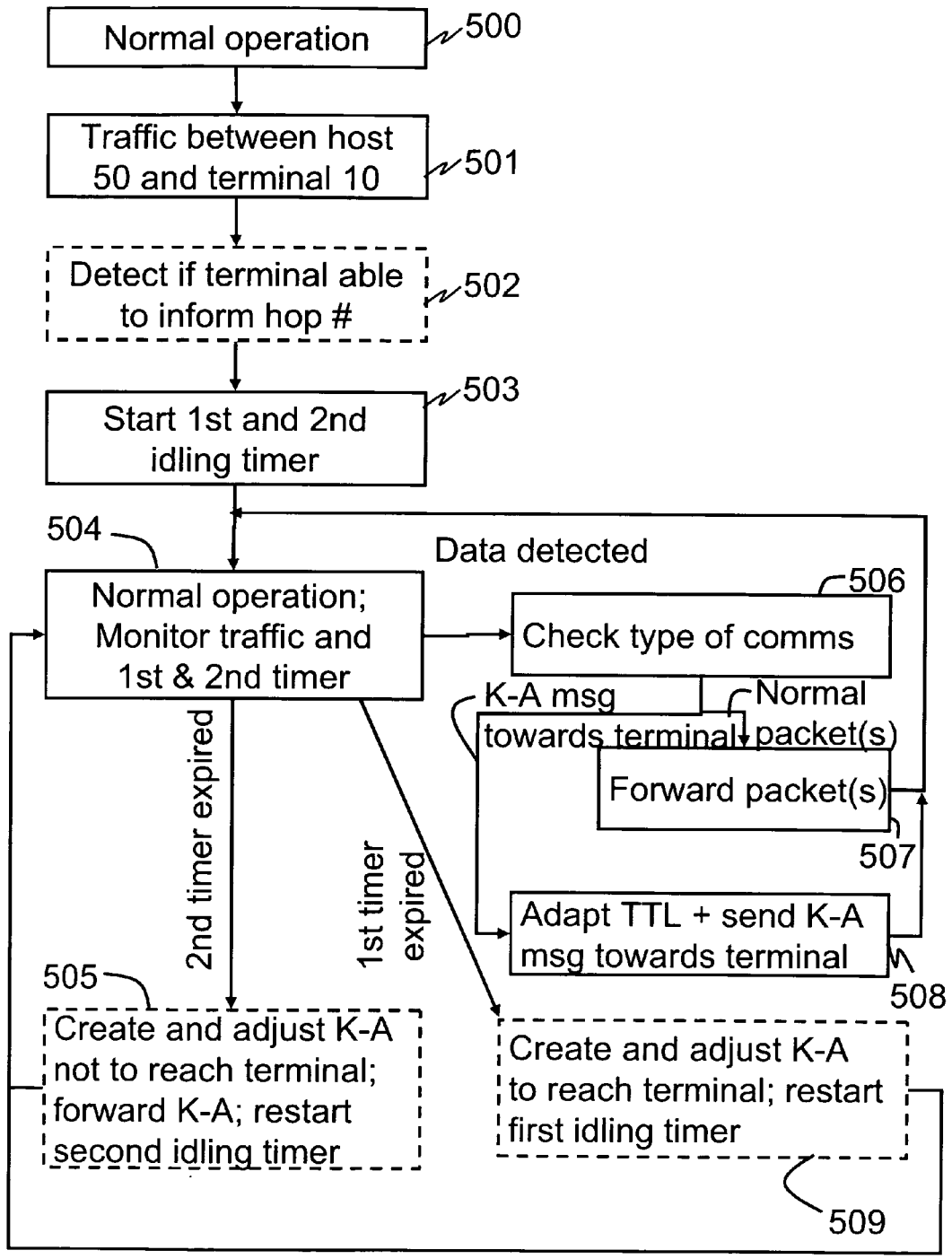
FIG. 5 shows a flow chart illustrating the operation in an adaptation element of FIG. 1.

FIG. 5 shows a flow chart illustrating the operation in the adaptation element of FIG. 3. Initially, the adaptation element AE 40 is serving other terminals and possibly also other hosts in a multitasking environment, in an embodiment in which the AE 40 is capable of multitasking. Hence, the first step of the flow chart is depicted as normal operation 500, where the AE 40 does not perform any particular role in relation to communications between the host 50 and the terminal 10. Next, the AE 40 detects 501 traffic between the terminal 10 and the host 50, as some routing element directs that traffic through the terminal 10 and the host 50. If the AE 40 is incorporated into the host 50 or into a radio access network, for instance, all traffic terminating to a host 50 or terminal 10 may respectively automatically be routed through the AE 40.

The AE 40 next detects 502, in an optional embodiment, whether the terminal 10 is capable of informing the number of hops between the terminal 10 and the AE 40 with a reliability that meets predetermined criteria, such as corresponding to comparative measurements with a pass rate meeting a given threshold.

The AE 40 next starts 503 a first idling timer for end-to-end keep-alive message control in order to create and send a keep-alive message that reaches the terminal 10 after a first predetermined interval. The AE 40 also starts a second idling timer to wait for a predetermined interval from a latest message between the terminal 10 and the host 50. The predetermined timeout interval (second idling timer) may be defined based on default values corresponding to the protocols used in the communications between the terminal 10 and host 50 or at least partly based on empirical data obtained from previous communications with the terminal 10 or with other nodes.

The AE 40 then monitors 504 the first and second idling timers until the respective first or second predetermined interval is met or until new communications between the terminal 10 and the host 50 are detected, in which case the process jumps to step 506.

After the first idling timer has met the predetermined first interval, it is time to output a keep-alive message that reaches the terminal 10 and the process jumps to step 509. In step 509, the AE 40 creates and outputs to the terminal 10 a keep-alive message with an adjusted TTL corresponding to at least the number of intervening hops. In yet another embodiment, the TTL is adjusted to a maximum value either always or according to a predetermined scheme, for example, once out of two, five or ten times the first interval is met. Following step 509, the process returns to step 504.

After the second idling timer has met the predetermined interval, it is time to create and output a keep-alive message that stops before the terminal 10, in step 505. The AE 40 acts to maintain the communication path between the terminal 10 and the host 50. At this stage, in one embodiment of the invention, the AE 40 creates and outputs to the terminal 10 a keep-alive message with an adjusted TTL corresponding to the number of intervening hops minus at least one. The AE 40 also restarts the second idling timer. After step 505, the operation returns to step 504.

Let us return to review step 506. It is recalled that if communications between the terminal 10 and host 50 were detected by the AE 40, the process advances to step 507. In step 507, the type of communications is checked. Unless a keep-alive data packet is received from the host 50 to the terminal 10, the data packet is simply forwarded 508 and the procedure resumes to step 504 to restart the second timer. In contrast, if a keep-alive data packet is detected in checking 507, the process advances to step 508 in which the AE 40 adapts the TTL field of the keep-alive data packet so that the keep-alive data packet will not reach the terminal (unless the hop number between the AE 40 and the terminal has changed) and passes the keep-alive data packet towards the terminal 10. The procedure next returns to step 504.

The expiration of the first idling timer may also trigger a procedure to measure again the number of hops between the terminal 10 and the adaptation element 40, which measured value will then subsequently be used when adjusting TTL fields. Alternatively, the procedure to measure again the number of hops between the terminal 10 and the adaptation element 40 may take place with an interval other than that defined by the first idling timer.

It should be understood that what is needed is to determine the number of hops downstream from the point of determination and to correspondingly adjust the TTL fields such that the keep-alive messages are routed to a desired extent towards the terminal 10. The desirable extent may be all the way to the terminal 10 or to a node before the terminal 10. The node before the terminal reside sufficiently distant to the terminal 10 to avoid causing radio traffic to the terminal 10 if it is a radio terminal but reside close enough to the terminal 10 in order to pass all such intervening network elements which, without the keep-alive messages, would close a session between the terminal 10 and the network party 50 in the absence of data traffic between the terminal 10 and the network party 50. Further, it is understood that if the network party 50 is relatively stationary in terms of its routing to the AE 40 (in terms of hop number), any changes in the number of hops between the AE 40 and the terminal 10 equal to the changes in the number of hops between the network party 50 and the terminal 10.

Figure 6:
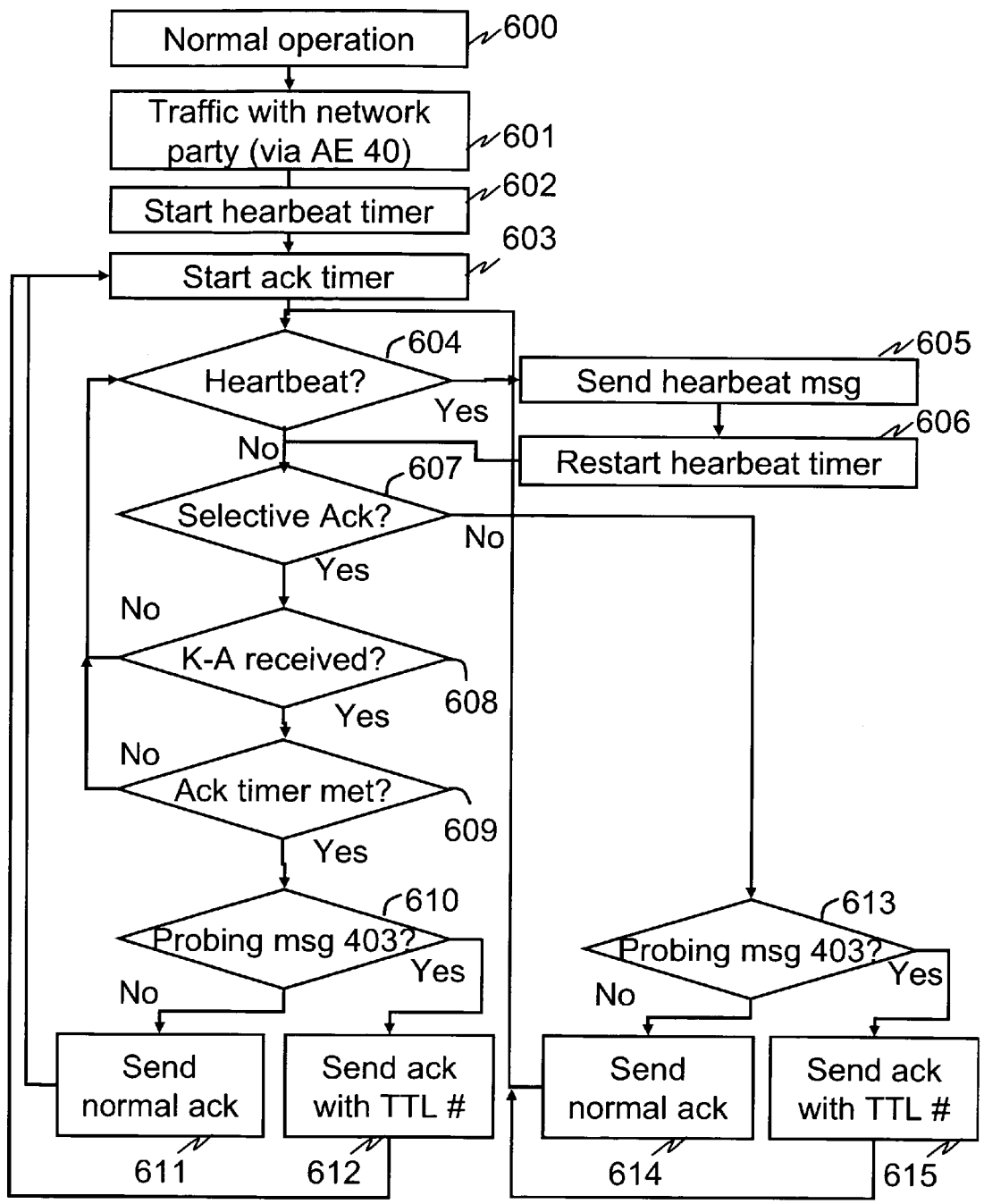
FIG. 6 shows a flow chart illustrating the operation in a terminal of FIG. 1.

It should also be understood that whilst the terminal 10 may typically or solely act as a client, the terminal 10 may additionally or alternatively act as a host providing some network service. For instance, the terminal may provide security such as running a remote security imaging (web camera) service or game services. FIG. 6 shows a flow chart illustrating the operation in the terminal 10 of FIG. 4. The flow chart starts from a point 600 at which the terminal 10 is in its normal operation. The terminal 10 exchanges data, that is, has data traffic with the network party 50 via the AE 40 in step 601. The terminal may next start sending a terminal-originated heartbeat. In an embodiment employing terminal originated heartbeat messages to ensure that the connection remains open all the way from the terminal 10 to the network party 50, the terminal 10 starts a heartbeat timer 602. If selective acknowledgements are used, a corresponding acknowledgement timer is started 603. Next, again subject to embodiment, it is checked 604 if a heartbeat message should be sent and, if yes, it is proceeded to sending 605 the heartbeat message and then the heartbeat timer is restarted in step 606. After step 606 or if the heartbeat timer is not met or if no terminal originated heartbeats are employed, the operation advances to step 607 in which it is checked whether selective acknowledgments to keep-alive messages are to be used. If yes, the operation proceeds to step 608 in order to check if a keep-alive message has been received, otherwise the operation jumps to step 613 to be explained in the following.

After step 607, when selective acknowledgments are used, it is checked 608 whether a keep-alive message has been received. If not, the operation returns to step 604 to check for heartbeat message timer (or to step 607 if no heartbeats are used). After finding out that a keep-alive message has been received, it is checked in step 609 whether the acknowledgment timer has been met, that is, whether its value meets a predetermined value. If yes, the process continues from step 610, otherwise it is returned to step 604 or 607 subject to embodiment in question.

In step 610, it is finally checked whether the keep-alive message received was a probing message in an embodiment of the invention. If yes, the operation proceeds to step 612 and the terminal 10 prepares an acknowledgement which carries in its payload either the TTL value of the received keep-alive message or an indication of that value, such as a difference to the value when the operation last had come to step 612. Then, the operation resumes to step 603 to restart the acknowledgement timer. If, however, the keep-alive message received was not a probing message, or in the embodiment in which probing messages are not supported, the terminal prepares a normal acknowledgement to the keep-alive message in step 611 and returns to starting the acknowledgement timer in step 603.

In case that operation jumped from step 607 to step 613, it would next be checked whether the received keep-alive message was a probing message as in step 610. From step 613, the operation branches as from step to 610 into step 614 or 615. In fact, the only difference between steps 613 to 615 and steps 610 to 612 is that after either of steps 614 and 615 the operation resumes to step 604 instead of step 603.

According to an embodiment of the invention a communication protocol is provided with definitions for header and/or payload fields such that the terminal 10 can be configured to implement the various embodiments of the invention. The protocol may be based on a common packet data protocol such as TCP or UDP protocol with an unmodified data packet in the payload, whilst the TTL is given a modified counter value, for example a counter value measured between the nodes less one or two. By providing various definitions in the payload of a common packet data protocol, the risk is diminished of various traffic filters or firewalls stopping data packets intended to arrive at the terminal 10.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

I claim:

1. A method comprising:
    outputting in a packet data network a first data packet from a network party towards a terminal;
    associating the first data packet with a time-to-live (TTL) adjusted to enable the first data packet to reach one or more intervening network entities but not to enable the first data packet to reach the terminal, in order to maintain traffic through the one or more intervening network entities to postpone expiry of a connection between the terminal and the network party in the one or more intervening network entities; and
    determining the number of hops remaining on the route of the first data packet to the terminal and the time-to-live associated with the first data packet is adjusted so that the time-to-live is set to be smaller than the determined number of hops.

2. A method according to claim 1, wherein the associating of the first data packet with the time-to-live occurs at an adaptation element other than the network party.

3. A method according to claim 1, further comprising outputting an acknowledgement to the network party responsive to the first data packet.

4. A method according to claim 3, wherein the outputting of the acknowledgment emulates sending the acknowledgement from the terminal.

5. A method according to claim 1, wherein the time-to-live is set to the measured number of hops subtracted by a predetermined amount, wherein the first data packet will pass the intervening network elements which are configured to close connections after certain duration of idle time.

6. A method according to claim 1, wherein the measuring of the number of hops is based on the network party outputting a first data packet with a predetermined number of hops configured in time-to-live to the terminal, the terminal sending to the network party a second data packet that contains an indication of the time-to-live of the first data packet when the terminal received it, wherein the number of hops on the route of the first data packet from network party to the terminal corresponds to the difference between the predetermined number and the indicated time-to-live of the first data packet.

7. A method according to claim 1, further comprising:
    monitoring at an adaptation element the data traffic originating from the terminal and traveling via the adaptation element;
    determining continuously from the data traffic an updated number of hops between the terminal and the adaptation element; and
    automatically adjusting the time-to-live of the first data packet according the updated number of hops.

8. A method according to claim 1, further comprising:
    monitoring data traffic originating from the terminal and traveling towards the network party;
    detecting a change in routing of the data traffic between the terminal and the network party; and
    responsive to the detecting of the change in routing:
        1) initiating a measurement procedure including transmitting a probing data packet to the terminal in order to determine a change in the number of hops between the terminal and the network part; and
        2) automatically adjusting the time-to-live of the first data packet according the determined change.

9. A method according to claim 8, wherein the packet data network comprises an adaptation element configured to access data packets traveling between the network party and the terminal, configured to perform the monitoring, detecting, initiating and automatic adjusting.

10. A method according to claim 1, wherein the terminal detects an incoming first data packet and responsively sends an indication that the number of the hops between the network party and the terminal has changed.

11. A method according to claim 10, further comprising the terminal further sending an indication of an updated number of hops responsive to the detecting of an incoming first data packet.

12. A method according to claim 1, further comprising performing the steps of outputting the first data packet and associating the time-to-live repeatedly with a first interval.

13. A method according to claim 1, wherein the packet data network comprises an adaptation element configured to access data packets traveling between the network party and configured to measure the number of hops between the adaptation element and the terminal with a second interval.

14. A method according to claim 1, further comprising sending a keep-alive message from the terminal to the network party at a third interval in order to ensure that the network party is still accessible to the terminal.

15. A method according to claim 1, further comprising the terminal selectively acknowledging received keep-alive data packets according to a predetermined scheme.

16. A method according to claim 10, wherein the acknowledging of received keep-alive data packets by the terminal is dependent on meeting at least one of the following criteria: having received a predetermined number of keep-alive data packets since previously acknowledging of a received keep-alive data packet, meeting a predetermined interval since previously acknowledging of a received keep-alive data packet, detecting a predetermined instruction from the network party, detecting a predetermined command associated with the most recently received keep-alive data packet, and detecting a predetermined command associated with the second most recently received keep-alive data packet.

17. An apparatus, comprising:
a processor;
memory including computer program code;
the memory and the computer program code configured to, with the processor, cause the apparatus at least to perform:
inputting a first data packet traveling in a packet data network from a network party towards a terminal, which packet data network comprises one or more intervening network entities on a route between the network party and the terminal;
associating the first data packet with a time-to-live adjusted to enable the first data packet to reach the one or more intervening network entities but not to enable the first data packet to reach the terminal, in order to maintain traffic through the one or more intervening network entities in order to postpone expiry of a connection between the terminal and the network party in the one or more intervening network entities; and
determining the number of hops remaining on the route of the first data packet to the terminal; and adjusting the time-to-live associated with the first data packet so that the time-to-live is set to be smaller than the determined number of hops.

18. An apparatus according to claim 17, wherein the apparatus is integrated or functionally contained in the network party.

19. An apparatus according to claim 17, wherein the apparatus is configured to output an acknowledgement to the network party responsive to the first data packet.

20. An apparatus according to claim 17, wherein the outputting of the acknowledgment is configured to emulate sending the acknowledgement from the terminal.

21. An apparatus according to claim 17, further configured to set the time-to-live to the measured number of hops subtracted by a predetermined amount, wherein adapted to cause the first data packet will pass the intervening network elements which are configured to close connections after certain duration of idle time.

22. An apparatus according to claim 17, further configured to measure the number of hops by: outputting a first data packet with a predetermined number of hops configured in time-to-live to the terminal; receiving from the terminal a second data packet that contains an indication of the time-to-live of an first data packet when the terminal received it, wherein the number of hops on the route of the first data packet from network party to the terminal corresponds to the difference between the predetermined number and the indicated time-to-live of the first data packet.

23. An apparatus according to claim 17, further configured to:
monitor the data traffic originating from the terminal and traveling via the apparatus;
determine continuously from the data traffic an updated number of hops between the terminal and the apparatus; and
automatically adjust the time-to-live of the first data packet according the updated number of hops.

24. An apparatus according to claim 17, further configured to:
monitor data traffic originating from the terminal and traveling towards the network party;
detect a change in routing of the data traffic between the terminal and the network party; and
responsive to the detecting of the change in routing:
1) initiate a measurement procedure including transmitting a probing data packet to the terminal in order to determine a change in the number of hops between the terminal and the network part; and
2) automatically adjust the time-to-live of the first data packet according the determined change.

25. An apparatus according to claim 17, further configured to output the first data packet and associate the time-to-live repeatedly with a first interval.

26. An apparatus according to claim 17, further configured to access data packets traveling between the network party and configured to measure the number of hops between the apparatus and the terminal with a second interval.

27. A computer readable medium having stored therein a computer program comprising computer executable program code configured to control an intermediate network element, comprising:
computer executable program code configured to cause the intermediate network element to input a first data packet traveling in a packet data network from a network party towards a terminal, which packet data network comprises one or more intervening network entities on a route between the network party and the terminal;
computer executable program code configured to cause the intermediate network element to associate the first data packet with a time-to-live adjusted to enable the first data packet to reach the one or more intervening network entities but not to enable the first data packet to reach the terminal, in order to maintain traffic through the one or more intervening network entities in order to postpone expiry of a connection between the terminal and the network party in the one or more intervening network entities, and
computer executable program code configured to determine the number of hops remaining on the route of the first data packet to the terminal; and to adjust the timeto-live associated with the first data packet so that the time-to-live is set to be smaller than the determined number of hops.

28. An apparatus, comprising:

means for inputting a first data packet traveling in a packet data network from a network party towards a terminal, which packet data network comprises one or more intervening network entities on a route between the network party and the terminal;

means for associating the first data packet with a time-to-live adjusted to enable the first data packet to reach the one or more intervening network entities but not to enable the first data packet to reach the terminal, in order to maintain traffic through the one or more intervening network entities in order to postpone expiry of a connection between the terminal and the network party in the one or more intervening network entities, wherein the apparatus is configured to determine the number of hops remaining on the route of the first data packet to the terminal; and to adjust the time-to-live associated with the first data packet so that the time-to-live is set to be smaller than the determined number of hops.

* * * * *

UNITED STATES PATENT AND TRADEMARK OFFICE
CERTIFICATE OF CORRECTION

| | |
|---|---|
| PATENT NO. | : 7,684,346 B2 |
| APPLICATION NO. | : 11/647614 |
| DATED | : March 23, 2010 |
| INVENTOR(S) | : Valli |

Page 1 of 1

It is certified that error appears in the above-identified patent and that said Letters Patent is hereby corrected as shown below:

Claim 21, col. 13, line 67 delete "adapted to cause".

Signed and Sealed this

Eleventh Day of May, 2010

David J. Kappos
*Director of the United States Patent and Trademark Office*